No. 682,976. Patented Sept. 17, 1901.
F E. DENZER & J. HULLT.
BICYCLE COASTER BRAKE.
(Application filed Feb. 20, 1901.)
(No Model.) 2 Sheets—Sheet 1.
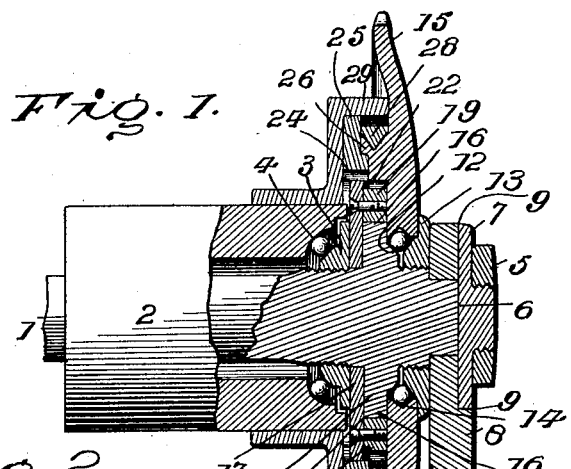
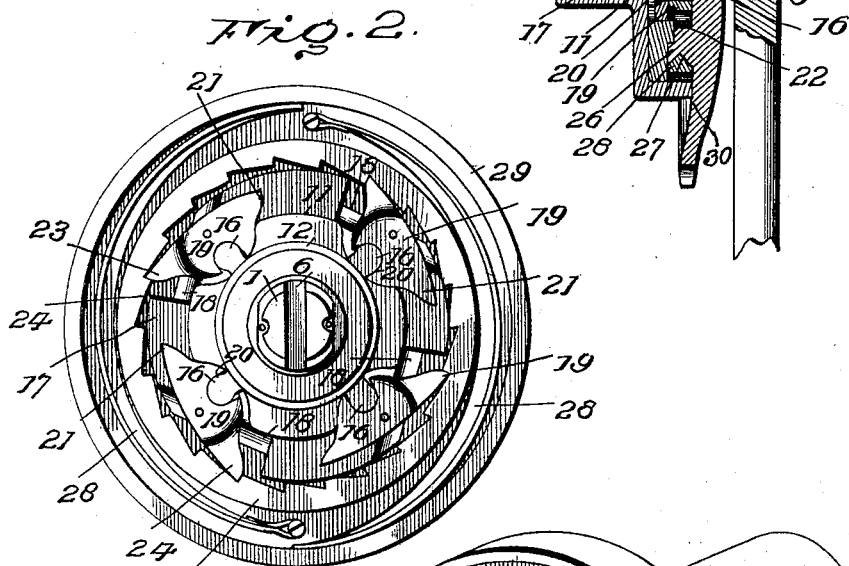
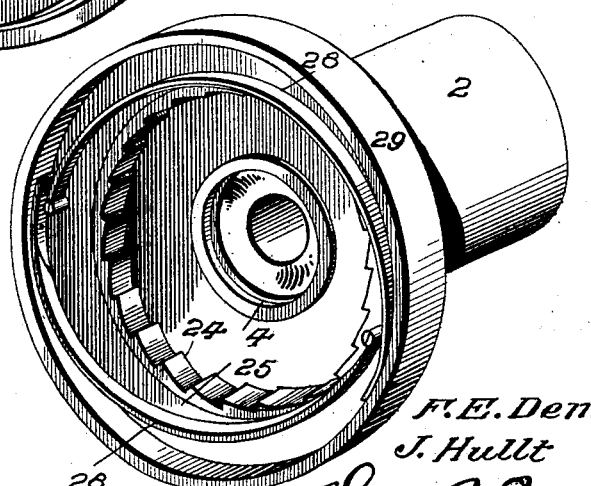
Inventors
F. E. Denzer
J. Hullt No. 682,976. Patented Sept. 17, 1901.
F E. DENZER & J. HULLT.
BICYCLE COASTER BRAKE.
(Application filed Feb. 20, 1901.)
(No Model.) 2 Sheets—Sheet 2.
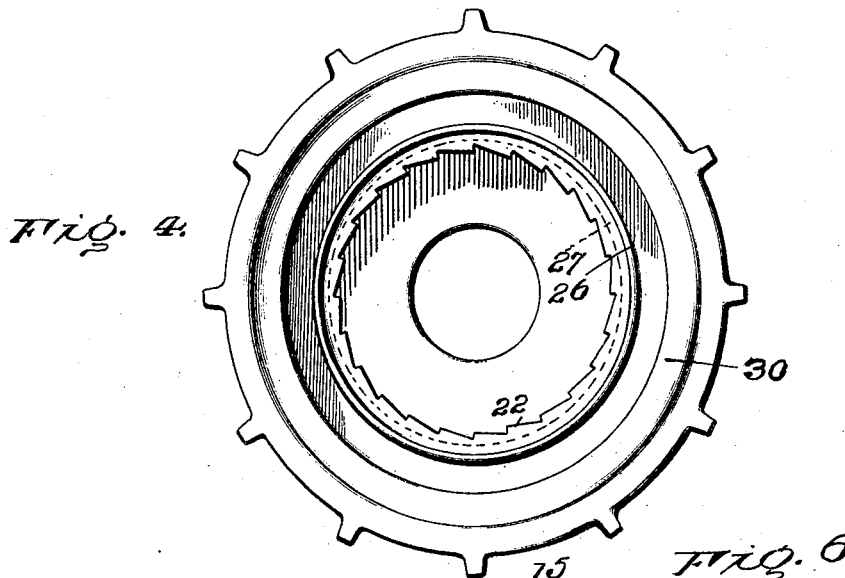
Fig. 4.
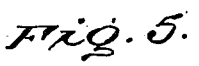
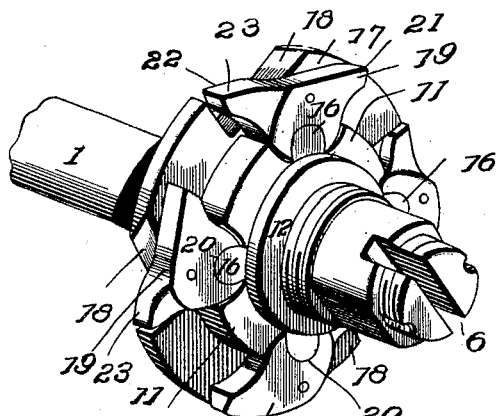
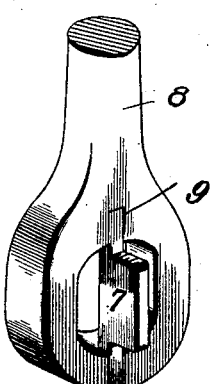
Fig. 7.
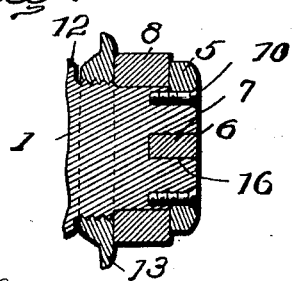
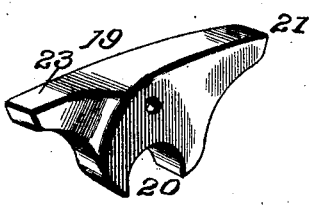
Witnesses
Inventors
F. E. Denzer
J. Hullt
By R. S. & A. B. Lacey,
Attorneys
THE NORRIS PETERS CO., PHOTO-LITHO., WASHINGTON, D. C.

UNITED STATES PATENT OFFICE.

FREDERICK E. DENZER AND JOHN HULLT, OF HOOD RIVER, OREGON.

BICYCLE COASTER-BRAKE.

SPECIFICATION forming part of Letters Patent No. 682,976, dated September 17, 1901.

Application filed February 20, 1901. Serial No. 48,153. (No model.)

*To all whom it may concern:*

Be it known that we, FREDERICK E. DENZER and JOHN HULLT, citizens of the United States, residing at Hood River, in the county of Wasco and State of Oregon, have invented certain new and useful Improvements in Bicycle Coaster-Brakes; and we do hereby declare the following to be a full, clear, and exact description of the invention, such as will enable others skilled in the art to which it appertains to make and use the same.

This invention has relation to the type of brakes for bicycles, tandems, and manually-propelled vehicles which are set by back-pedaling or a reversing of the power to check the speed of the machine.

While the brake can be applied to the wheel or to the sprocket without materially changing its construction or the principles of the invention, it is preferred to attach it to the sprocket and crank-axle, as shown in the accompanying drawings and set forth in the following description.

The purpose of the invention is efficiency, durability, positive action, certainty of operation, lightness, compactness, and accessibility to the parts for oiling, cleaning, repairing, and any desired purpose.

For a full description of the invention and the merits thereof and also to acquire a knowledge of the details of construction of the means for effecting the results reference is to be had to the following description and drawings hereto attached.

While the essential and characteristic features of the invention are necessarily susceptible of modification, still the preferred embodiment of the invention is illustrated in the accompanying drawings, in which—

Figure 1 is a detail section lengthwise of the crank-hanger, showing the relation of the parts entering into the formation of the brake. Fig. 2 is a side view, the crank and sprocket being removed. Fig. 3 is a detail view of the brake-actuating ring. Fig. 4 is detail perspective view of the sprocket-wheel. Fig. 5 is a detail perspective view of an end portion of the crank-axle, showing the pawls, the pawl-carrier, and the pawl-actuator. Fig. 6 is a perspective view of the inner end portion of the crank-arm and key, the latter being detached. Fig. 7 is a detail section showing the means for securing the crank to the axle. Fig. 8 is a detail perspective view of a pawl.

Corresponding and like parts are referred to in the following description and indicated in all the views of the drawings by the same reference characters.

The crank-axle 1 may be mounted in any selected manner and, as shown, is journaled in the crank-hanger 2 of a bicycle or analogous manually-propelled machine. A cone 3 is secured to the crank-axle and coöperates with a cup 4 of the crank-hanger to provide a ball-race in which antifriction devices are placed. The outer end portion of the crank-axle is threaded to receive a nut 5 and is transversely slotted at 6 to receive a key 7, spanning the eye of the crank-arm 8 and having its terminal portions let into notches 9, formed at diametrically opposite points. The middle portion of the key is widened, so as to come flush with the outer end of the crank-axle and completely close and fill the slot 6. The nut 5 engages with the terminal portions of the key 7 and holds them in the notches 9. The nut when screwed home upon the outer threaded end of the crank-axle is prevented from loosening by means of a locking device, which, as shown, consists of a screw 10, threaded into an opening formed in the joint between the nut and crank-axle. For safety two screws are employed, although one may suffice.

A pawl-actuator 11 is secured upon the crank-axle so as to rotate therewith and may be keyed thereto or formed therewith. A cone 12 is formed at the outer end of the pawl-actuator, and a companion cone 13 is adjustable upon the threaded portion of the crank-axle to vary the size of the ball-race formed between the cones 12 and 13 and the groove 14, formed in the central opening of the sprocket-wheel 15. The balls or antifriction devices are located in the ball-race formed by the cones 12 and 13 and the groove 14 and touch the walls of said race at four points. The outer end of the cone 13 is flanged and overlaps the opening of the sprocket-wheel and may be milled or knurled to facilitate the turning of the cone to take up wear. Cogs 16 are formed at intervals around the periphery of the pawl-actuator 11, and their outer ends are rounding. These cogs do not project from the pawl-actuator, but are formed by notching or cutting away portions of the periphery of the pawl-actuator, as most clearly shown.

A pawl-carrier 17 is loosely mounted upon the crank-axle between the cone 3 and pawl-actuator 11 and is formed in its periphery with notches 18 to receive an end portion of the pawls 19, which are pivoted midway of their ends thereto. This pawl-carrier consists of a disk or ring, and the notches 18 have their radial walls cut square and their tangential walls beveled toward the pawl-actuator to provide clearance for the contiguous offset ends of the respective pawls. The pawls 19 are widened centrally and have notches 20 in their inner edges of a shape and size to receive the cogs 16, which coöperate therewith. The pawls are double-ended, the ends 21 being in the plane of the pawl-actuator and adapted to engage with the teeth 22 of the sprocket-wheel 15, and the ends 23 being offset, so as to lie in the plane of the pawl-carrier and engage with the teeth 24 of the brake-actuating ring 25. Each of the pawls 19 is pivoted centrally to the pawl-carrier 17 and is adapted to turn in its pivot-fastening, so as to throw either end into action, according to the application of power to the crank-axle. By having the pawl-actuator rotatable with the crank-axle and the pawl-carrier loosely mounted upon said crank-axle movement of the latter is transmitted to the pawl-carrier by means of the pawls and the pawl-actuator. The first or initial movement of the crank-axle effects the turning of the pawls upon their pivot-fastenings so as to throw one or the other of their ends into engagement with either the teeth of the ratchet-wheel or the teeth of the brake-actuating ring, according to the direction of application of power to the crank-axle. A forward movement of the crank-axle throws the ends 21 of the pawls into engagement with the teeth 22 of the sprocket-wheel and causes rotation of the latter and propulsion of the wheel connected for rotation therewith. A reverse movement of the crank-axle causes the ends 23 of the pawls to engage with the teeth 24 of the brake-actuating ring 25, whereby the brake is set to check the speed of the machine in the manner well understood.

The sprocket-wheel 15 is provided upon its inner face with a ring or flange 26, constituting an element of the brake mechanism. This ring or flange 26 is of a size to receive the pawl-actuator and pawls, and its inner edge is formed with the teeth 22. The outer edge of the ring or flange has a V-shaped groove 27 to coöperate with brake-straps 28 of corresponding shape and which have one end secured to the brake-actuating ring 25 and the other end attached to a cup or casing 29, secured to the crank-hanger and inclosing the operating parts of the brake mechanism. An annular depression 30 is formed in the inner face of the sprocket-wheel and receives the flange or rim of the cup 29 and forms a close joint therewith for the exclusion of dust and foreign matter.

The brake-actuating ring 25 is located within the cup or casing 29 and encircles the pawl-carrier 17, and its inner edge is provided with the teeth 24. The brake-straps 28 may be of any material best adapted for the purpose and are resilient, so as to automatically release the ring or flange 26 the instant back pressure upon the pedals is removed. The brake-straps may be provided in desired number, two being shown, and are located at one side of the brake-actuating ring 25 and in the plane of the brake ring or flange 26.

When the parts are assembled, they are inclosed by means of the cup 29 and the sprocket-wheel 15, and upon imparting forward rotation to the crank-axle the ends 21 of the pawls engage with the teeth 22 of the sprocket-wheel and cause rotation thereof with the crank-axle and power to be imparted to the machine and part connected therewith. When back-pedaling is resorted to, either voluntarily or involuntarily, the pawl-actuator is moved backward and throws the ends 23 of the pawls into engagement with the teeth 24 of the brake-actuating ring, whereby the latter is turned so as to cause the brake-straps 28 to grip the brake-ring 26, whereby the speed of the machine is checked in the well-known manner. When the pawls 19 are turned to an intermediate position between their extreme movements, they are disconnected from the sprocket-wheel and brake-actuating ring, thereby permitting the machine to run freely in either direction. This is of special advantage when coasting, as will be readily appreciated. When coasting or resting on the pedals, power can be instantly applied or the brake set, according as the pedals are moved forward or backward.

Having thus described the invention, what is claimed as new is—

1. In a brake mechanism of the character described, and in combination with means for propelling the bicycle forward the brake elements, and a brake-actuating member, pawls for coöperation with the brake-actuating member, a loosely-mounted carrier for the pawls, and a pawl-actuator operated by means of the propulsive power and adapted to throw the pawls into and out of engagement with the said brake-actuating member, substantially as set forth.

2. In a brake mechanism of the character described, and in combination with means for propelling the bicycle forward the brake elements and a loosely-mounted brake-actuating member, a loosely-mounted carrier, pawls pivoted to said carrier and adapted to coöperate with the brake-actuating member, a pawl-actuator operated by the propulsive power, and interlocking cogs between the pawl-actuator and pawls for positive actuation of the latter in opposite directions, substantially as set forth.

3. In brake mechanism of the character described, and in combination with means for propelling the bicycle forward the brake elements and a brake-actuating member, a carrier in the plane of the brake-actuating member and notched in its periphery, pawls pivoted to one side of the said carrier and having one of their ends offset to enter the notches and engage with the brake-actuating member, and a pawl-actuator at one side of said carrier and adapted to positively throw the pawls into and out of action, substantially as specified.

4. In a brake mechanism of the character set forth, and in combination with means for propelling the bicycle forward the brake elements and brake-actuating member, a loosely-mounted carrier, pawls pivoted intermediate of their ends to said carrier and having their middle portions widened and notched at their inner edges, and a pawl-actuator having portions of its periphery notched or cut away at intervals to provide cogs to enter the notches of the pawls and turn the latter positively in opposite directions upon their pivotal fastenings, substantially as and for the purpose set forth.

5. In combination, a sprocket-wheel or kindred part having an offstanding ring or flange, a brake-actuating ring, brake-straps having one end connected with the brake-actuating ring and adapted for coöperation with the aforementioned brake ring or flange, double-ended pawls pivotally supported between their ends, a power-driven axle, and a pawl-actuator secured to said axle for rotation therewith and having interlocking connection with the pawls to throw them by a positive movement into and out of action with, respectively, the brake-actuating ring and the brake ring or flange of the sprocket-wheel, substantially as set forth.

6. In combination, a power-driven axle, a sprocket-wheel having an offstanding brake ring or flange, a brake-actuating ring, brake elements set by means of the brake-actuating ring, a loosely-mounted carrier, pawls pivoted between their ends to said carrier, and a pawl-actuator attached to the aforementioned axle and having interlocking connection with the pawls to move them positively in either direction for engagement with either the brake-actuating ring or the sprocket-wheel, substantially as set forth.

7. In combination, a power-driven axle, a fixed cup or casing, a sprocket-wheel having a depression in one side to receive the flange or rim of the cup and having a brake ring or flange, a brake-actuating ring located within the cup, brake-straps having one end attached to the rim of the cup and the other end attached to the brake-actuating ring, a carrier located within the brake-actuating ring, double-ended pawls pivoted midway of their ends to the said carrier, and a pawl-actuator attached to the aforesaid axle for positive operation of the pawls to throw them into engagement either with the brake-actuating ring or the sprocket-wheel, substantially as set forth.

In testimony whereof we affix our signatures in presence of two witnesses.

FREDERICK E. DENZER. [L. S.]
  JOHN HULLT. [L. S.]

Witnesses:
 E. L. ROOD,
 GEO. T. PRATHER.